United States Patent [19]

Bogue et al.

[11] Patent Number: 5,520,859
[45] Date of Patent: May 28, 1996

[54] METHOD FOR FLASH FLOW PROCESSING HAVING FEED RATE CONTROL

[75] Inventors: Beuford A. Bogue, Broad Run; John A. Hrubec, Annandale, both of Va.

[73] Assignee: Fuisz Technologies Ltd., Chantilly, Va.

[21] Appl. No.: 225,258

[22] Filed: Apr. 8, 1994

Related U.S. Application Data

[62] Division of Ser. No. 133,747, Oct. 7, 1993, Pat. No. 5,346, 377.

[51] Int. Cl.⁶ .................................................. B29C 67/00
[52] U.S. Cl. ............................................ 264/8; 264/40.4
[58] Field of Search .............................. 264/8, 40.4, 40.7

[56] References Cited

U.S. PATENT DOCUMENTS

| Re. 32,016 | 10/1985 | Esders et al. . |
|---|---|---|
| 856,424 | 6/1907 | Robinson . |

(List continued on next page.)

FOREIGN PATENT DOCUMENTS

| 609135 | 4/1988 | Australia . |
|---|---|---|
| 609137 | 4/1988 | Australia . |
| 900605 | 11/1977 | Belgium . |
| 1303511 | 4/1988 | Canada . |
| 0287488A1 | 3/1988 | European Pat. Off. . |
| 0387950A1 | 8/1990 | European Pat. Off. . |
| 86052 | 4/1988 | Israel . |
| 86053 | 4/1988 | Israel . |
| 88/2770 | 4/1988 | South Africa . |
| 88/2771 | 4/1988 | South Africa . |
| 89/9318 | 12/1989 | South Africa . |
| 90/2139 | 3/1990 | South Africa . |
| 90/8406 | 8/1991 | South Africa . |
| 519858 | 5/1971 | Switzerland . |
| 489211 | 7/1986 | Switzerland . |
| 2155934 | 3/1985 | United Kingdom . |
| WO91/18613 | 5/1991 | WIPO . |

OTHER PUBLICATIONS

R. H. Doremus, "Crystallization of Sucrose From Aqueous Solution," *Journal of Colloid and Interface Science*, 104, pp. 114–120 (1985).
P. Bennema, "Surface Diffusion and the Growth of Sucrose Crystals," *Journal of Crystal Growth*, 3,4 pp. 331–334 (1968).
T. D. Simpson, et al., "Crystalline Forms of Lactose Produced in Acidic Alcoholic Media," *Journal of food Science*, 47, pp. 1948–1954 (1982).
A. D. Randolph, et al., "Continuous Sucrose Nucleation," *The International Sugar Journal*, pp. 8–12 (1974).
K. B. Domovs, et al., "Methanol–Soluble Complexes of Lactose and of other Carbohydrates," *J. Dairy Science*, 43, pp. 1216–1223 (1960).
A. D. Randolph, et al., "Continuous Sucrose Nucleation," *The International Sugar Journal*, pp. 35–38 (1974).
ICI Americas Inc., "ICI Americas Products for Cosmetics and Pharmaceuticals," (1977).
Domino Sugar Corporation, "Co–crystallization".
Domino Sugar Corporation, "Raspberry".
Domino Sugar Corporation, "Molasses Dark".

*Primary Examiner*—Mary Lynn Theisen
*Attorney, Agent, or Firm*—Hoffmann & Baron

[57] ABSTRACT

A material processing apparatus and method for flash flow processing by melt spinning. The invention includes a feed rate controller in combination with a spinner head assembly including a spinner head with a continuous perimeter for providing heat and centrifugal force to a material being processed. The spinner head assembly also includes a spinner drive connected to the spinner head for generating the centrifugal force. The material processing apparatus can also include support for supporting the spinner head assembly, where the feed rate controller is electrically connected to the support. The feed rate controller determines a detected load of material in the spinner head from data provided by the support, compares it to a preselected load for the material being processed and generates a feed rate control signal indicative of a difference between the detected and preselected loads. A feeder assembly supplies the feedstock material to the spinner head at a feed rate defined by the feed control signal.

7 Claims, 5 Drawing Sheets

U.S. PATENT DOCUMENTS

| | | |
|---|---|---|
| 1,489,342 | 4/1924 | Brent . |
| 1,541,378 | 6/1925 | Parcell . |
| 2,826,169 | 3/1958 | Le Veen . |
| 2,918,404 | 12/1959 | Mende . |
| 3,019,745 | 2/1962 | Du Bois . |
| 3,036,532 | 5/1962 | Bowe . |
| 3,067,743 | 12/1962 | Merton et al. . |
| 3,070,045 | 12/1962 | Bowe . |
| 3,073,262 | 1/1963 | Bowe . |
| 3,095,258 | 6/1963 | Scott . |
| 3,118,396 | 1/1964 | Brown et al. . |
| 3,118,397 | 1/1964 | Brown et al. . |
| 3,125,967 | 3/1964 | Bowe . |
| 3,131,428 | 5/1964 | Mika . |
| 3,308,221 | 3/1967 | Opfell . |
| 3,324,061 | 6/1967 | Tanquary et al. . |
| 3,482,998 | 12/1969 | Carroll et al. . |
| 3,523,889 | 8/1970 | Eis . |
| 3,557,717 | 1/1971 | Chivers . |
| 3,595,675 | 7/1971 | Ash et al. . |
| 3,615,671 | 10/1971 | Schoaf . |
| 3,625,214 | 12/1971 | Higuchi . |
| 3,676,148 | 7/1972 | De Wesse et al. . |
| 3,723,134 | 3/1973 | Chivers . |
| 3,749,671 | 7/1973 | Gedge et al. . |
| 3,762,846 | 10/1973 | Chivers . |
| 3,766,165 | 10/1973 | Rennhard . |
| 3,856,443 | 12/1974 | Salvi . |
| 3,875,300 | 4/1975 | Homm et al. . |
| 3,876,794 | 4/1975 | Rennhard . |
| 3,907,644 | 9/1975 | Möllering et al. . |
| 3,912,588 | 10/1975 | Möllering et al. . |
| 3,925,164 | 12/1975 | Beaucamp et al. . |
| 3,925,525 | 12/1975 | LaNieve . |
| 3,930,043 | 12/1975 | Warning et al. . |
| 3,951,821 | 4/1976 | Davidson . |
| 3,967,623 | 7/1976 | Butterworth et al. . |
| 3,972,725 | 8/1976 | Nicol . |
| 3,981,739 | 9/1976 | Dmitrovsky et al. . |
| 3,992,265 | 11/1976 | Hansen . |
| 4,056,364 | 11/1977 | Dmitrovsky et al. . |
| 4,072,658 | 2/1978 | Okamoto et al. . |
| 4,086,418 | 4/1978 | Turbak et al. . |
| 4,090,920 | 5/1978 | Studer, Jr. . |
| 4,136,145 | 1/1979 | Fuchs et al. . |
| 4,153,512 | 5/1979 | Messner et al. . |
| 4,159,210 | 6/1979 | Chen et al. . |
| 4,160,696 | 7/1979 | Wu . |
| 4,164,448 | 8/1979 | Röeschlau et al. . |
| 4,168,205 | 9/1979 | Danninger et al. . |
| 4,186,251 | 1/1980 | Tarbutton . |
| 4,194,063 | 3/1980 | Frank et al. . |
| 4,241,178 | 12/1980 | Esders et al. . |
| 4,271,199 | 6/1981 | Cherukuri et al. . |
| 4,293,292 | 10/1981 | Israel . |
| 4,293,570 | 10/1981 | Vadasz . |
| 4,303,684 | 12/1981 | Pitchon et al. . |
| 4,335,232 | 6/1982 | Irwin . |
| 4,338,350 | 7/1982 | Chen et al. . |
| 4,348,420 | 9/1982 | Lynch et al. . |
| 4,362,757 | 12/1982 | Chen et al. . |
| 4,371,516 | 2/1983 | Gregory et al. . |
| 4,376,743 | 3/1983 | Dees . |
| 4,382,963 | 5/1983 | Klose et al. . |
| 4,492,685 | 1/1985 | Keith et al. . |
| 4,496,592 | 1/1985 | Kuwahara et al. . |
| 4,500,546 | 2/1985 | Turbak et al. . |
| 4,511,584 | 4/1985 | Percel et al. . |
| 4,526,525 | 7/1985 | Oiso et al. . |
| 4,581,234 | 4/1986 | Cherukuri et al. . |
| 4,585,797 | 4/1986 | Cioca . |
| 4,619,833 | 10/1986 | Anderson . |
| 4,722,845 | 2/1988 | Cherukuri et al. . |
| 4,747,881 | 5/1988 | Shaw et al. . |
| 4,765,991 | 8/1988 | Cherukuri et al. . |
| 4,772,477 | 9/1988 | Weiss et al. . |
| 4,793,782 | 12/1988 | Sullivan . |
| 4,797,288 | 1/1989 | Sharma et al. . |
| 4,839,184 | 6/1989 | Cherukuri et al. . |
| 4,846,643 | 7/1989 | Yamamoto et al. . |
| 4,855,326 | 8/1989 | Fuisz . |
| 4,871,501 | 10/1989 | Sugimoto et al. . |
| 4,872,821 | 10/1989 | Weiss . |
| 4,879,108 | 11/1989 | Yang et al. . |
| 4,885,281 | 12/1989 | Hanstein et al. . |
| 4,900,563 | 2/1990 | Cherukuri et al. . |
| 4,931,293 | 6/1990 | Cherukuri et al. . |
| 4,978,537 | 12/1990 | Song . |
| 4,981,698 | 1/1991 | Cherukuri et al. . |
| 4,997,856 | 3/1991 | Fuisz . |
| 5,009,893 | 4/1991 | Cherukrui et al. . |
| 5,011,532 | 4/1991 | Fuisz . |
| 5,023,632 | 7/1991 | Fuisz . |
| 5,034,421 | 7/1991 | Fuisz . |
| 5,037,662 | 8/1991 | Poulose et al. . |
| 5,039,446 | 8/1991 | Estell . |
| 5,041,377 | 8/1991 | Becker et al. . |
| 5,057,328 | 10/1991 | Cherukuri et al. . |
| 5,066,218 | 11/1991 | Silver . |
| 5,073,387 | 12/1991 | Whistler . |
| 5,082,682 | 1/1992 | Peterson . |
| 5,082,684 | 1/1992 | Fung . |
| 5,084,295 | 1/1992 | Whelan et al. . |
| 5,089,606 | 2/1992 | Cole et al. . |
| 5,094,872 | 3/1992 | Furcsik et al. . |
| 5,096,492 | 3/1992 | Fuisz . |
| 5,164,210 | 11/1992 | Campbell et al. . |
| 5,169,657 | 12/1992 | Yatka et al. . |
| 5,169,658 | 12/1992 | Yatka et al. . |
| 5,171,589 | 12/1992 | Richey et al. . |
| 5,173,317 | 12/1992 | Hartman et al. . |
| 5,173,322 | 12/1992 | Melachouris et al. . |
| 5,175,009 | 12/1992 | Synosky et al. . |
| 5,196,199 | 3/1993 | Fuisz . |
| 5,238,696 | 8/1993 | Fuisz . |
| 5,279,849 | 1/1994 | Fuisz et al. . |
| 5,284,659 | 2/1994 | Cherukuri et al. . |
| 5,286,513 | 2/1994 | Fuisz . |
| 5,288,508 | 2/1994 | Fuisz . |

METHOD FOR FLASH FLOW PROCESSING HAVING FEED RATE CONTROL

This is a divisional of application(s) Ser. No. 08/133,747 filed on Oct. 7, 1993, now U.S. Pat. No. 5,346,377.

BACKGROUND OF THE INVENTION

The present invention relates to flash flow processing, and, more particularly, to improvements in melt spin processing machines to enhance process capability.

Various machines have been designed for spinning feedstock materials, particularly sugar, while at the same time applying heat to the feedstock. The materials may be introduced to a spinner assembly within the spinning machine in molten form or, alternatively, introduced in solid form and heated to the flow point or subjected to flash-flow just prior to being spun out from the spinner assembly.

U.S. Pat. No. 4,872,821 discloses a spinning machine that is particularly designed for spinning cotton candy. The machine includes a spinner head having slotted, cylindrical walls and heating elements adjacent to each wall. Sugar in solid form is introduced into the spinner head and propelled against the heating elements where it is made flowable and spun out through the slots where it solidifies into the floss-like material known as cotton candy.

Various other machines have been designed over the years for spinning cotton candy. One such machine is disclosed in U.S. Pat. No. 3,930,043. This machine includes a helical resistance heating element positioned within a finely perforated shell. The heating element is supported against the inner wall of the shell by spacer elements. As the shell spins, molten sugar moves through the perforations. Similar machines are disclosed in U.S. Pat. Nos. 3,073,262 and 3,070,045.

Still another machine for spinning substances is disclosed in commonly owned, co-pending U.S. patent application Ser. No. 07/954,257, now abandoned, to Fuisz. The application discloses a spinner head including a heating element which defines a narrow, elongate opening providing a substantially non-tortuous path through which feedstock material subjected to flash-flow is projected. Various other spinning machines of the prior art are referenced therein.

A basic spinning machine includes a spinning head with a heating element arranged circumferentially therearound. Sugar is introduced to the spinner head and dispersed along the heating element. Heat from the heating element thereby changes the physical structure of the sugar sufficiently to permit the sugar to flow through openings and form the floss product. In early models, heat is applied as the spinner head rotates whereby the floss product is generated. The early models had virtually no means for controlling the various factors that strongly influenced the quality of the spun product. These factors include: the temperature of the heating element and therefore the amount of power directed to the heating element, the size of the opening through which feedstock material is projected, and feed rate at which the feedstock material is fed into a feeder assembly for processing by the spinner head.

In the more recent models, methods of controlling the several above-mentioned factors have been implemented. For example, commonly owned, co-pending U.S. patent application Ser. No. 08/049,773 discloses a temperature feedback control method and apparatus to precisely control heating of the feedstock material during the flash flow process. Such temperature control ensures more consistent spin processing operation and a higher quality spun product.

A method for attempting to control the volume of processing material within a spinner head of a melt spin machine is disclosed in U.S. Pat. No. 3,930,043. The rate that sugar is fed to the spinner head is mechanically controlled by detecting a physical displacement of a portion of the sugar present within the head and shaped according to a vortex formed by the spinning head. More or less sugar is fed into the rotating head according to the detected physical displacement of the sugar therein. This method of feed rate control, however, is inexact. Shifts in the melt spin machine may shift the detectable mass rendering inaccurate displacement detection. Accordingly, the mass of sugar (or feedstock material) present in the spinner head may exceed or fall short of an amount commensurate with the spinning machine's ability to smoothly process it. Carbonization of the heating element and product burning are the likely result.

It is therefore an object of this invention to provide a material processing method and apparatus for flash flow melt spin processing with feed rate control characteristics capable of preventing overloading of the processing head with an excessive volume of processing material.

A still further object of the invention is to provide a material processing apparatus for flash flow melt spin processing having feed rate control achieved using a detected weight of the processing head to determine the flow rate of feedstock material into the processing head necessary for producing a high quality product.

SUMMARY OF THE INVENTION

In accordance with these and other objects of the invention, a material processing apparatus for flash flow melt spin processing is provided with feed rate control characteristics. The apparatus includes a spinner head assembly with a spinner head and a spinner driver. The spinner head has a continuous perimeter for providing heat and centrifugal force to a material being processed and a heating element substantially continuous with the perimeter for generating the heat. The spinner driver is connected to the spinner head for providing the centrifugal force thereto.

The material processing apparatus also includes support means for supporting the spinner head assembly and detecting a force exerted by the spinner head assembly on the support means. A feed rate controller electrically connected to the support means determines a load of the material in the spinner head, comparing the load to a preselected load and determining a difference therefrom. A feeder assembly responsive to the difference causes the material to be supplied to the spinner head. In the preferred embodiment, the load is determined by one or more sensors which continuously weigh the spinner head assembly and detect the additional weight present there due to the load of feedstock material introduced to the head.

A method of the present invention for flash-flow processing having feed rate control includes the steps of supplying heat, centrifugal force and feedstock material to a spinner head for processing, continuously detecting a load of feedstock material present within the spinner head and generating a load signal corresponding thereto, and comparing the load signal to a signal representative of a preselected load of the material. The method also includes the step of controlling the rate that the feedstock material is supplied to the spinner head according to the comparison signal. Preferably, the weight of feedstock material is continuously detected generating a weight signal which is then compared to a set point indicative of a preselected weight. The rate at which feedstock material is supplied to the head is thereby controlled.

The present invention includes a feed rate controller for controlling a feed rate of feedstock material provided to a spinner head for flash flow processing. The feed rate controller includes at least one load detector positioned to support the spinner head for generating at least one load signal indicative of a load of feedstock material present in the spinner head. A process controller responsive to the load signal continuously compares the detected load to a preselected load, determining a difference between the detected and preselected loads. Control means responsive to such difference controls the feed rate.

The process controller can include means for generating a select signal indicative of the preselected load and means for generating a process control signal according to a difference between the preselected load and the actual load, defined by at least one load signal; the control means are responsive to the process control signal. A summer may sum the load signal(s) and generate a summation load signal therefrom for use by the process controller for generating the process control signal. Preferably, a signal processor filters short term variations from the summation load signal.

A method for controlling a feed rate at which feedstock material is supplied to a spinner head for melt spin processing is also provided by the invention. The method includes the steps of continuously detecting a load of feedstock material present within the spinner head and generating a load signal therefrom, comparing the detected load signal with a select signal indicative of the preselected load. The method also includes generating a feed rate control signal from the comparison, and controlling the rate at which the feedstock material is provided to the spinner head in response to the feed rate control signal. In this manner, the processing rate for the material being processed is controlled to provide a substantially constant flow rate of the material through the spinner head. The preferred method includes continuously detecting the weight of feedstock material within the spinner head assembly, generating a signal therefrom, and comparing the detected weight to a set point whereby the feed rate is controlled.

As a result of the process and apparatus of the present invention, the rate at which feedstock is provided to a spinner head for flash flow melt spinning may be controlled to prevent overloading and underloading of the spinner head with feedstock material. The controlled feed rate enables a consistently higher quality flash flow product to be produced resulting from the present invention's ability to provide a flow rate that is ideal for a selected feedstock. Further, the controlled flow rate of feedstock to the spinner head avoids carbonization of the heating element and product burning, common in flash flow processing machines of the prior art.

DETAILED DESCRIPTION OF THE INVENTION

A material processing method and apparatus is provided for flash flow melt spin processing having feed rate control characteristics.

"Feedstock" as used herein refers to solid materials which flow when heated. The feedstock material undergoes intraparticle flow when heated prior to undergoing substantial degradation or decomposition. Feedstock materials useful herein include thermoplastic polymers as well as materials such as sugars, saccharides, polysaccharides, etc., which exhibit intraparticle flow when heated. Examples of such materials are sugars as disclosed in U.S. Pat. No. 4,855,326, issued Aug. 8, 1989, polydextroses as disclosed in U.S. application Ser. No. 881,603, filed May 12, 1992, now U.S. Pat. No. 5,279,849, maltodextrins (including corn syrup solids) as disclosed in U.S. application Ser. No. 847,595, filed Mar. 5, 1992, now U.S. Pat. No. 5,387,431, and thermoplastic polymers such as disclosed in U.S. application Ser. No. PCT/US92/04053, filed May 13, 1992, and biodegradable polymers as disclosed in U.S. application Ser. No. 893,238, filed Jun. 3, 1992, all of which are incorporated herein by reference.

"Melt spinning" as used herein refers to a process by which feedstock material is subjected to flash flow sufficiently to deform and pass through an opening under a centrifugal force provided by a spinner head. After the flowable material is thrown through the opening at high speed, it instantaneously reforms as a solid having altered physical and/or chemical structure. The altered structure results from the forces acting on the material as it exits the head and is hurled outwardly during the brief period during which it experiences flash flow.

In order to provide uniform high quality melt spun product, the present invention provides for controlling a feed rate of the load of feedstock material supplied to a spinner head of a melt spin machine during processing. In one embodiment, a feed rate controller of the present invention controls the feed rate of feedstock material to the spinner head according to a detected weight of feedstock material present in the spinner head.

Figure 1:
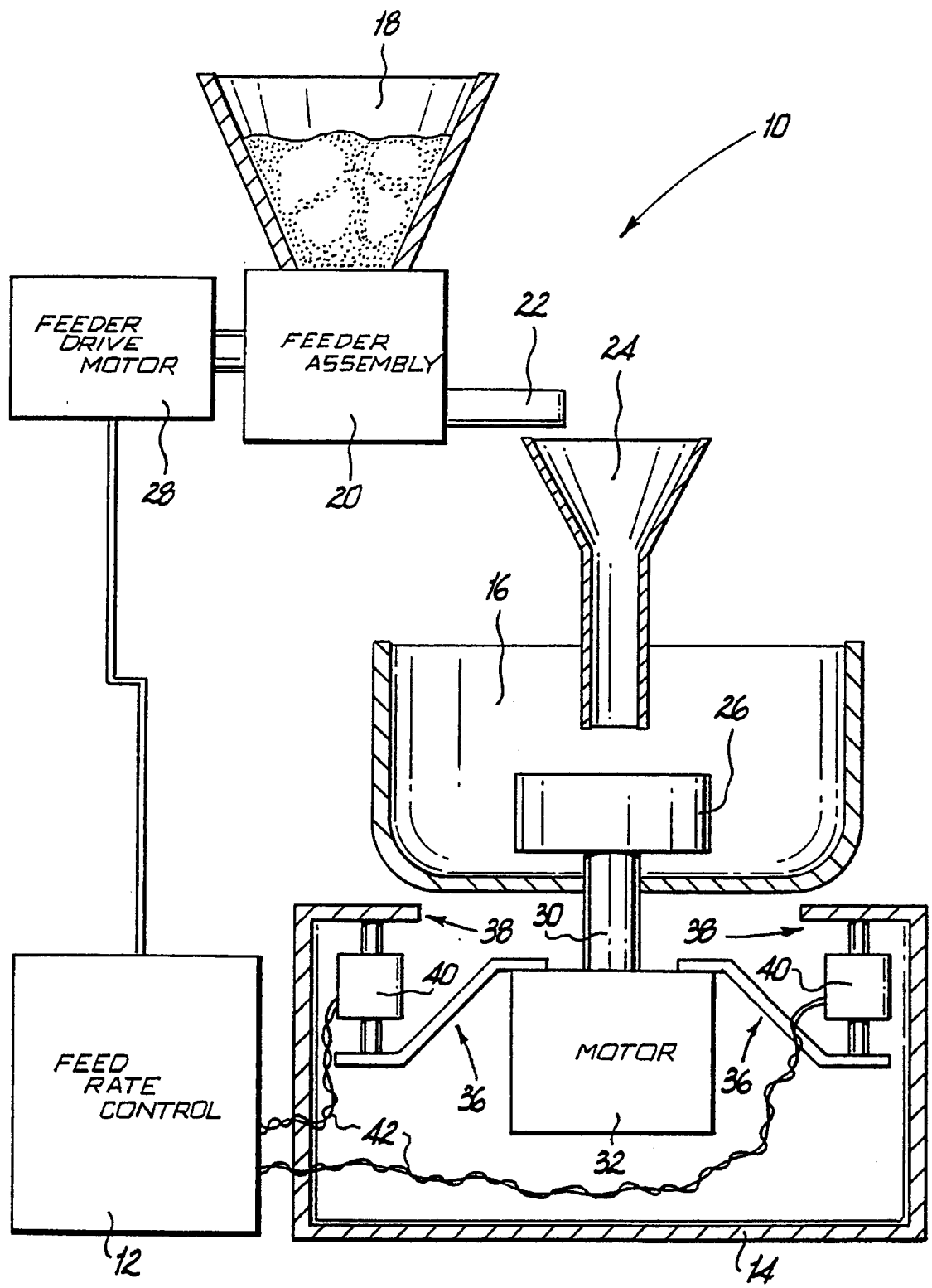
FIG. 1 is a schematic diagram of a material processing apparatus including a feed rate controller of the present invention.
Figure 5:
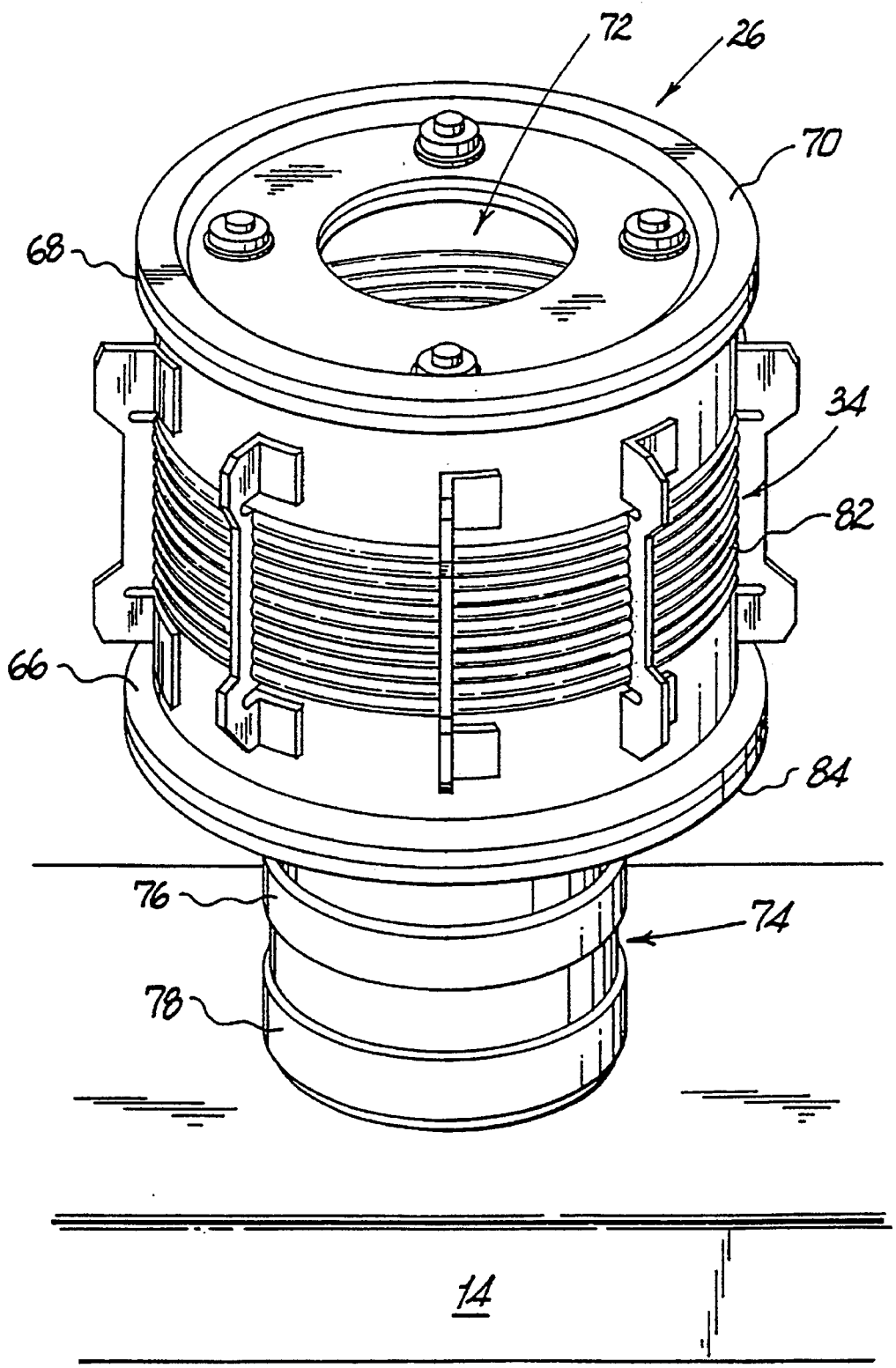
FIG. 5 is a perspective view of a spinner head in accordance with the present invention.

FIG. 1 shows a spin processing apparatus 10 provided with a feed rate controller 12 of the present invention. The apparatus 10 includes a base 14 upon which is mounted a basin assembly 16. The feedstock material is provided from a hopper 18 through a feeder assembly 20 and out a chute 22.. A funnel 24 directs feedstock material from the chute into basin assembly 16 to a spinner head 26 contained therein. The feeder assembly 20 is driven by feeder drive motor 28 to convey the feedstock material through chute 22 into spinner head 26. A motor shaft 30 mechanically connects spinner head 26 to spinner motor 32. The spinner head is caused to rotate at a selected speed about the axis of motor shaft 30, whereby the feedstock material is propelled directly against a heating element 34 (FIG. 5). The materials are subjected to sufficient heat thereat to compel them to undergo flash-flow.

Upon undergoing flash-flow, the materials are projected from the spinner head 26 into the basin assembly 16 due to the considerable centrifugal force generated by the spinner head's rotation. The morphology of the finished product, which reforms as a solid upon exiting the spinner head 26, depends upon the speed at which the spinner head is rotated, the temperature maintained by the heating element 34, the openings through which the material is projected, and the amount of feedstock material present in the spinner head during processing.

Spinner motor 32, shaft 30 and spinner head 26 are supported by a number of motor mount members 36 mechanically connecting motor 32 to base 14. A first end of each motor mount 36 is attached at a top portion 38 of motor 32. A second end of each motor mount member 36 is mechanically connected to a bottom portion of each of a plurality of load cells 40. A top portion of each of the plurality of load cells is connected to a top portion 38 of base 14. In such a manner, the spinner motor 32 and spinner head 26 are supported at load cells 40 via motor mount member 36.

Load cells 40 detect the force required to support the above mentioned combination, i.e., its weight. Using the weight of the above mentioned assembly devoid of feedstock material as a normalized zero baseline, continual determination of the exact weight of feedstock material present within the spinner head 26 is determined during processing. The weight of a particular feedstock material can easily be correlated with a correct volume of the material. Desired volume of a particular feedstock material in the spinner head 26 may be preselected.

Each load cell 40 generates a load signal proportional to the weight it detects. The preferred embodiment includes four (4) load cells. Each load cell is electrically connected via electrical wires 42 to feed rate controller 12. Feed rate controller 12 receives the load signals generated within each load cell 40 and determines therefrom the exact weight of processing material present within the spinner head 26. The feed rate controller 12 compares the determined weight to the preselected weight (or load) of the material being processed. Based on the comparison, the feed rate controller determines and adjusts a rate of flow of material to the spinner head.

Figure 2:
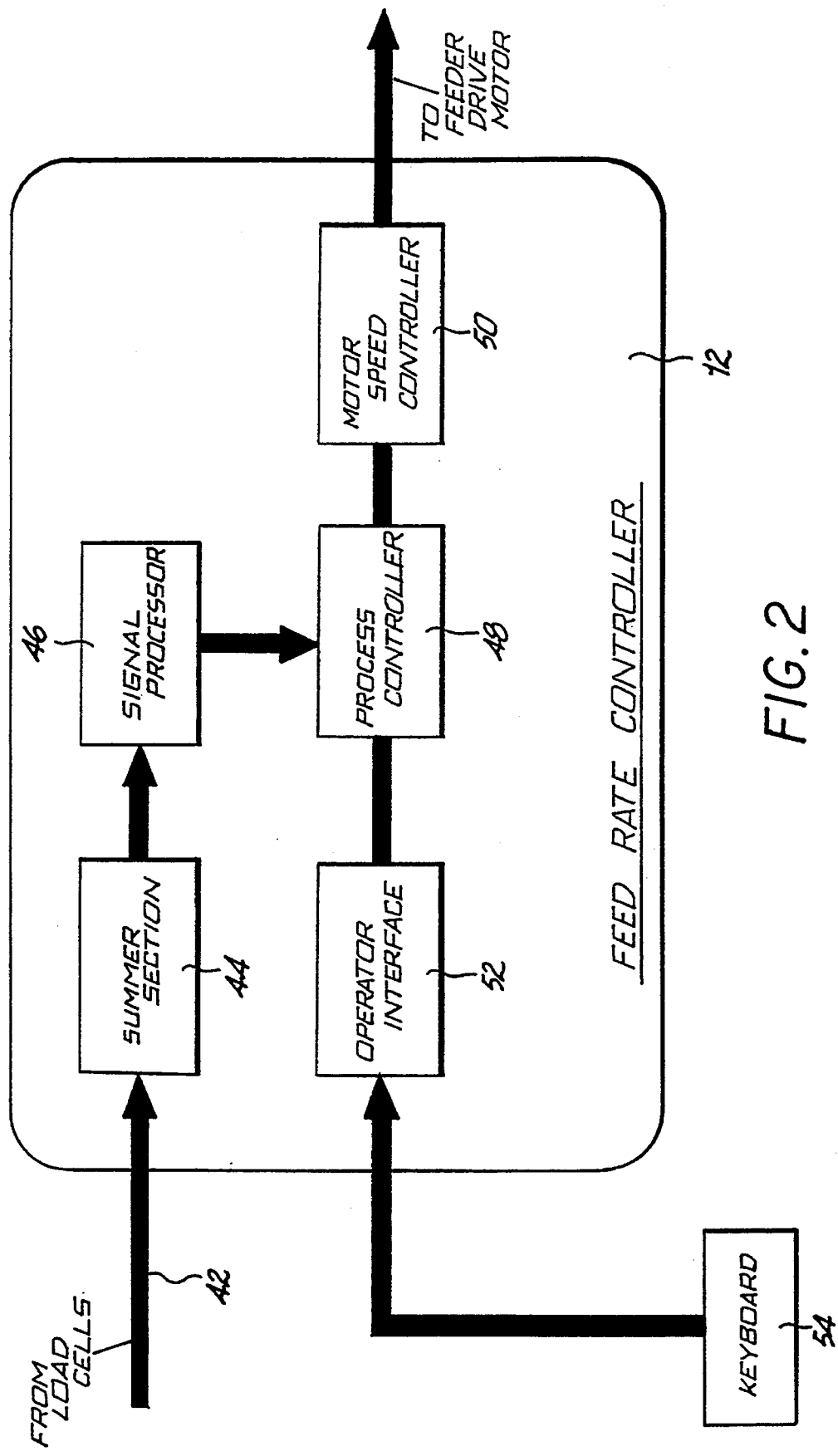
FIG. 2 is a schematic block diagram depicting the feed rate controller of the present invention.

FIG. 2 shows a block diagram of the preferred feed rate controller 12 depicted in FIG. 1. Each load cell 40 is shown electrically connected to a summer section 44 via electrical wires 42. Summer section 44 electrically combines the load signals from each of the load cells 40 into one summation load signal. The summation load signal is transferred to a signal processor 46, where short term variations in the summation load signal due to such effects as mechanical vibration and wobble, inherent in the rotating system, are filtered out.

The filtered summation load signal is transmitted from signal processor 46 to a process controller 48. Process controller 48 receives the filtered summation load signal, using it to generate a process control signal to control a motor speed controller 50. Motor speed controller 50 receives the process control signal and generates a feed rate control signal. The motor speed controller 50 provides the feed rate control signal to feeder drive motor 28. Feeder drive motor 28 is mechanically connected to feeder assembly 20 to control the rate of feeding material flowing to spinner head 26.

In the preferred embodiment, process controller 48 is a microcomputer. The microcomputer within process controller 48 uses an algorithm implemented by computer code to derive the actual weight of the feedstock material within the spinner head 26. The process controller correlates a feedstock being processed to a preselected weight in the form of a set point or select signal for the particular feedstock material. The process controller compares the detected weight to the preselected weight, i.e., compares a signal indicative of the detected weight to the select signal. The preselected weight may be determined within the process controller 48 according to many factors related to a particular feedstock such as: desired end product morphology, processing temperature, ambient humidity, etc. The process controller 48 generates the process control signal based on the comparison of the detected and preselected weight thereby controlling the flow rate of material to the spinner head.

If the weight sensed by load cells 40 is too small, i.e., the spinner head 26 does not contain the preselected load for a particular material being processed, the process controller 48 can change the magnitude of the process control signal provided to motor speed controller 50. The rate of the material flow to the spinner head 26 is increased thereby. If the weight sensed by load cells 40 is large, i.e., the spinner head 26 contains a load too large for a particular material being processed, the magnitude of the process control signal is again changed accordingly. The rate of material flow to the spinner head 26 is decreased thereby.

The present invention is directed to controlling the rate at which feedstock material is delivered to a spinner head for flash flow processing. The preferred form of the invention detects the weight of feedstock material present in the spinner head, compares it to an ideal weight and adjusts the feed rate to the spinner head accordingly. The invention, however, is not limited to controlling the feed rate of feedstock material to the spinner head during processing based on weight detection. Any means for detecting an amount or load of feedstock within the spinner head during processing and for controlling the feed rate in response thereto may be implemented by one skilled in the art without departing from the scope and spirit of this invention.

An operator interface 52 may supply processing information to process controller 48 in addition to information supplied by signal processor 46. The operator interface 52 provides information such as the amount of material required for optimal operation of spinner head 26 as well as various control parameters which may alter the result of the processing algorithm implemented by process controller 48. The operator interface 52 also may receive data from process controller 48 to inform an operator of the status of spin processing operation. The operator interface 52 can also enable an operator to void all calculation and select the desired load to be controlled, i.e., direct user control of the feed rate. Operator interface 52 may take on any form, such as a keyboard 54, known to those skilled in the art.

Figure 3:
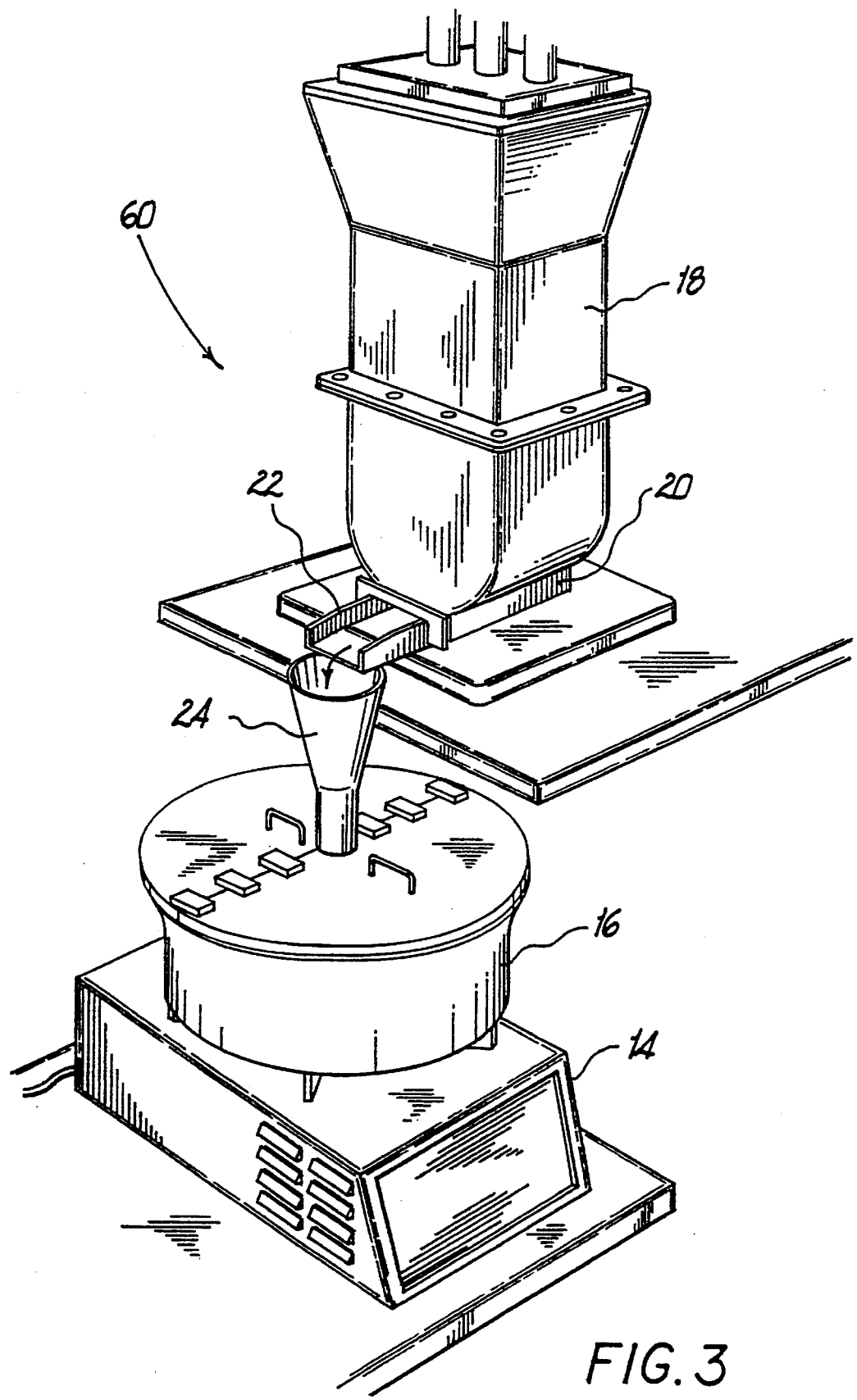
FIG. 3 is a perspective view of an assembly for processing feedstock materials.

FIG. 3 shows a melt spin processing assembly 60 in which feedstock materials are fed to a spinner head 26 (FIG. 1) where they may be subjected to a flash-flow process and collected in a basin or basket or air conveyed to another location or to a collection container. The assembly 60 includes hopper 18, chute 22, basin assembly 16 (which houses the spinner head), funnel 24 for directing material from the chute 22 to the spinner head 26, and base 14. Feeder assembly 20 is positioned at the base of the hopper 18, the chute 22 extending therefrom. The feeder assembly 20 is connected to a feeder drive motor 28 (FIG. 1) and may include any means known to those skilled in the art for moving material from the hopper 18 to the funnel 24 and into the spinner head 26. The base includes spinner motor 32 (FIG. 1) for driving the spinner head 26. The spinner head may be driven in a known manner as described in U.S. Pat. No. 4,872,821 (incorporated by reference herein), which has been converted to a variable speed drive system.

Figure 4:
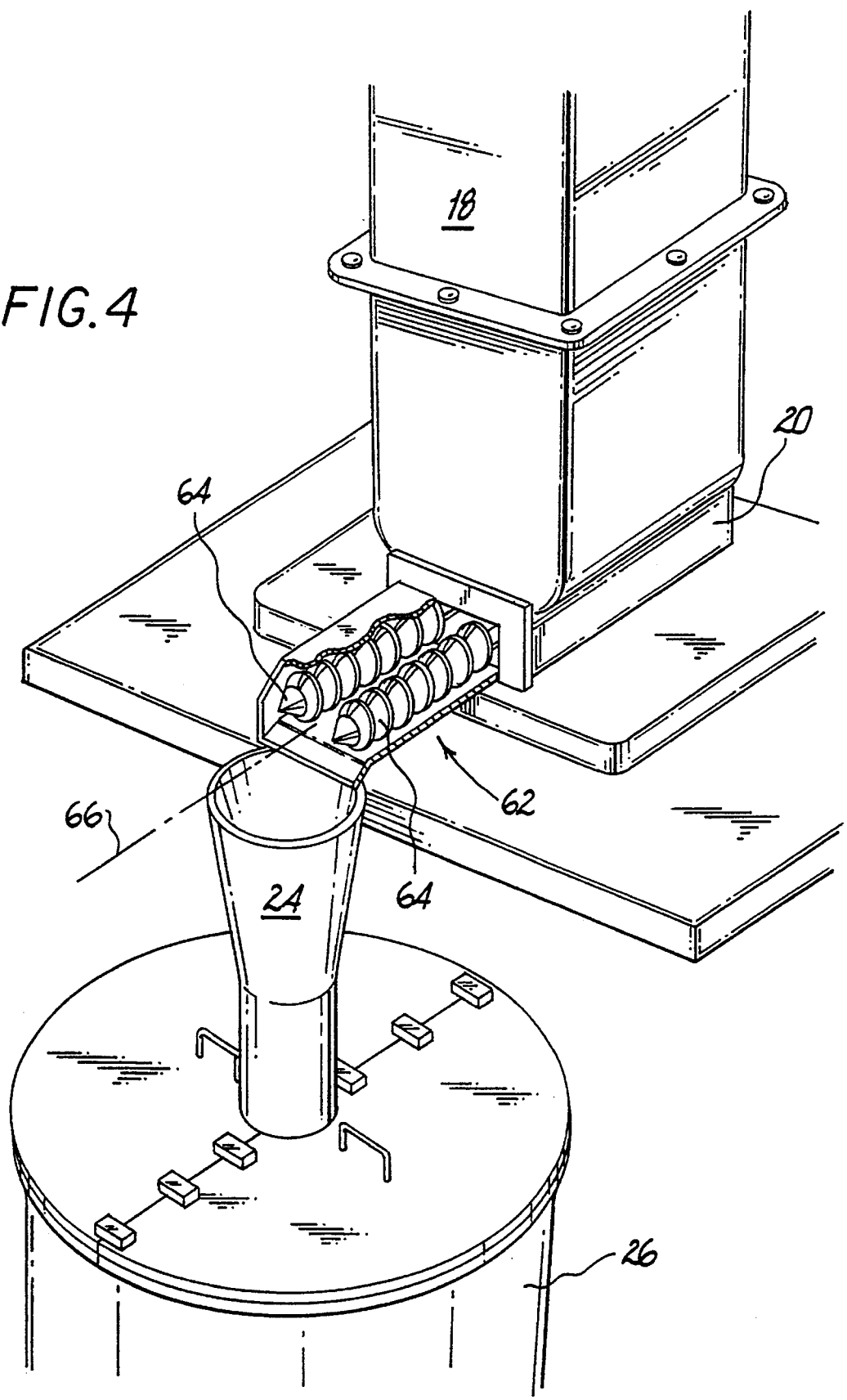
FIG. 4 is a perspective view of an embodiment of a screw type feeder used with the present invention.

FIG. 4 shows an embodiment of the present invention utilizing a screw-type feeder for moving material from the hopper 18 into the spinner head 26. Screw-type feeder 62 is used in place of chute 22. Screw rotators 64 within the screw-type feeder are aligned with a feed axis 66. The screw rotators 64 are rotationally driven by feeder drive motor 28 (contained within feeder assembly 20) thereby causing feedstock to move from the hopper 18 into the funnel 24.

FIG. 5 show one embodiment of a spinner head 26 which may be used in accordance with a feed rate controller 12 (FIG. 1) of the invention. The spinner head includes a base member 84, a bottom insulating ring 66, a top insulating ring 68, an aluminum cap 70, and heating element 34. The base and cap may be made from stainless steel or other suitable material, while the insulating rings are preferably from a ceramic material or heat resistant polymer. The cap includes a cap opening 72 aligned with the funnel 24.

FIG. 5 shows a stem 74 which extends from the base 14. The stem includes slip rings 76, 78 which are engaged by brushes (not shown), and upright motor shaft 30 which is driven by motor 32 within the base 14. The stem 74 is similar to that disclosed in U.S. Pat. No. 4,872,821, and functions in a similar manner. An electronic interface assembly 80 is mounted to the base member 84, and powers the heating element 34.

The present invention may utilize any type heating element known to those skilled in the art. The heating element 34 of the present embodiment is comprised of a cable 82 which is wound helically about the axis of rotation of the spinner head 26. While the cable 82 forms a single helix as shown in the drawing, it may alternatively be wound as a double helix or multiple helixes, i.e., such as eight separate cables. Cable heaters are well-known commodities, and are used in a number of applications, including some of the cotton candy machines discussed above. A suitable cable includes a core heating element (not shown) such as a nichrome, ALUMEL™ or INCONEL™ wire. INCONEL™ is a trademark for a nickel-chromium-steel alloy which is sold under the INCONEL™ mark. The outside sheath is also made of a corrosive-resistant alloy such as INCONEL™, and high temperature electrical insulation such as magnesium oxide.

The spinner head 26 may also be provided with a continuous wall heating element with openings, such as slots, for permitting flash flow through the wall.

The specific embodiments of the feed rate controller and apparatus for flash flow processing having feed rate control that are identified in the disclosure may be replaced by other means without materially affecting the feed rate control operation according to the invention. The invention accordingly is not limited to the precise embodiments disclosed, and various other changes and modifications may be affected therein by one skilled in the art without departing from the scope or spirit of the invention.

What is claimed is:

1. A method of controlling a feed rate at which feedstock material is fed to a spinner head of a melt spin processing apparatus, comprising the steps of:

continuously detecting a load of feedstock material present within the spinner head and generating a load signal therefrom;

comparing said load signal with a select signal indicative of a preselected processing load and generating a feed rate control signal from the comparison; and controlling the rate at which the feedstock material is provided to the spinner head in response to said feed rate control signal.

2. A method as defined in claim 1, further comprising the step of filtering said load signal to remove short term variations therefrom.

3. A method as defined by claim 1, wherein the step of continuously detecting includes detecting a weight of the feedstock material, and wherein said step of comparing includes comparing the detected weight with a preselected processing weight.

4. A method as defined by claim 1, further comprising the step of inputting data for directly controlling said feed rate.

5. A method for flash flow melt spin processing, comprising the steps of:

supplying heat, centrifugal force and feedstock material to a spinner head for processing;

continuously detecting a load of feedstock material present within the spinner head and generating a load signal according thereto;

comparing said load signal to a select signal representing a preselected load and generating a comparison signal therefrom; and controlling the rate that feedstock material is supplied to the spinner head according to said comparison signal.

6. A method as defined by claim 5, wherein the step of controlling includes receiving direct user input.

7. A method as defined by claim 6, wherein said step of continuously detecting includes detecting a weight of said feedstock material, and wherein said step of comparing includes comparing said detected weight to a preselected weight.

\* \* \* \* \*